United States Patent
Shingai

(10) Patent No.: US 8,229,181 B2
(45) Date of Patent: Jul. 24, 2012

(54) IMAGE PROCESSING DEVICE, IMAGE PROCESSING METHOD AND IMAGE PROCESSING PROGRAM

(75) Inventor: Kosuke Shingai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 747 days.

(21) Appl. No.: 12/415,766

(22) Filed: Mar. 31, 2009

(65) Prior Publication Data

US 2009/0245650 A1  Oct. 1, 2009

(30) Foreign Application Priority Data

Apr. 1, 2008 (JP) .................................. 2008-094776

(51) Int. Cl.
| | |
|---|---|
| G06K 9/46 | (2006.01) |
| G06K 9/66 | (2006.01) |
| G06K 9/36 | (2006.01) |
| G06K 9/20 | (2006.01) |
| G06K 9/32 | (2006.01) |

(52) U.S. Cl. ........ 382/118; 382/190; 382/195; 382/276; 382/282; 382/298

(58) Field of Classification Search .................. 382/118, 382/190, 195, 276, 282, 298
See application file for complete search history.

(56) References Cited

U.S. PATENT DOCUMENTS

| 7,324,669 | B2 * | 1/2008 | Nakanishi et al. ............ 382/118 |
| 7,953,294 | B2 * | 5/2011 | Andres del Valle .......... 382/291 |
| 2009/0041357 | A1 * | 2/2009 | Yonezawa et al. ............ 382/195 |
| 2011/0064331 | A1 * | 3/2011 | Andres del Valle .......... 382/308 |
| 2011/0157175 | A1 * | 6/2011 | Andres del Valle .......... 345/419 |

FOREIGN PATENT DOCUMENTS

JP  2004-318204  11/2004

* cited by examiner

Primary Examiner — John Strege
(74) Attorney, Agent, or Firm — DLA Piper LLP (US)

(57) ABSTRACT

An image processing device includes a face region extracting unit that extracts a face region of a person included in an image to be corrected. A correction region specifying unit specifies a region including the extracted face region as a reduction region and specifies a region excluding the reduction region as an enlargement region. A correction execution unit generates a correction image in which an image in the reduction region is reduced based on a predetermined reduction ratio and an image in the enlargement region is enlarged according to a ratio of the reduction region to the enlargement region.

7 Claims, 5 Drawing Sheets

IMAGE PROCESSING DEVICE, IMAGE PROCESSING METHOD AND IMAGE PROCESSING PROGRAM

CROSS-REFERENCE TO RELATED APPLICATIONS

This application claims the benefit of priority under 35 USC 119 in Japanese application no. 2008-094776, filed on Apr. 1, 2008, which is incorporated herein by reference.

BACKGROUND

1. Technical Field

The present invention relates to an image processing device, method and program for correcting an image.

2. Related Art

In the related art, in order to give a preferable appearance to a subject of an image, such as a person in a photo, a central portion of the image is reduced and both ends of the image are enlarged such that the aspect ratio of the image is not changed, and the subject person is viewed slimly. Such a slim function may be implemented in a multifunction peripheral (MFP) printer or the like.

The appearance of a person in an image may be further improved by a function for specifying a face region of the person and correcting the contour of the face, such as suggested in JP-A-2004-318204.

However, the subject person is not always located in the center of the image. In the function for slimming the center of the image in the related art, a person that is out of the center may become distorted or big. For example, in the related art, as shown in FIG. 5A, even when the person is out of the center of the image, the process of slimming the image based on the center is performed. In this process, as shown in FIG. 5B, a predetermined range from the center of the image (between lines b-1 and b-4) is set as a reduction region and the range outside of the reduction region is set as an enlargement region. A boundary between the reduction region (b-1 to b-4) and the enlargement region is specified. The image in the reduction region within lines (b-1) and (b-4) is reduced to fit within lines (b-2) and (b-3). Simultaneously, the image in the enlargement region outside of lines (b-1) and (b-4) is enlarged to the region outside of lines (b-2) and (b-3). In this case, as shown in FIG. 5B, a person at a position away from the center of the image is enlarged and becomes distorted or big.

Meanwhile, the technology of JP-A-2004-318204 cannot correct the whole person of the subject by correcting only the face region.

SUMMARY

The present invention provides an image processing device, method and program that correct a whole person to give a preferable appearance, without restriction to the case that the person is at the center of the image.

An image processing device according to one aspect of the invention includes: a face region extracting unit extracting a face region of a person included in an image to be corrected; a correction region specifying unit specifying a region including the extracted face region as a reduction region and specifying a region excluding the reduction region as an enlargement region; and a correction execution unit generating a correction image in which an image in the reduction region of the image is reduced based on a predetermined reduction ratio and an image in the enlargement region of the image is enlarged according to a ratio of the reduction region to the enlargement region.

In an image processing device having this configuration, a face region of a person is extracted from an image, a region including the extracted face region is specified as a reduction region and is subjected to reduction correction, an enlargement region that is subjected to enlargement correction is specified, and a correction image in which an image in the reduction region is reduced based on a predetermined reduction ratio and an image in the enlargement region is enlarged according to a ratio of the reduction region to the enlargement region is generated.

By this configuration, reduction and enlargement regions are specified based on the position of the face of the person and the image is corrected according to the position of the person, regardless of the position at which the face of the person is present, for example, even when the person is present at a position away from the center.

The image processing device of the invention may further include a central axis detecting unit detecting a central axis passing through the center of a face of the extracted face region, and the correction region specifying unit may specify a region of a range of a vertical direction with respect to the detected central axis as the reduction region.

In an image processing device having this configuration, a central axis passing through a center of the face of the extracted face region is detected and a region of a range including the face region that expands in a vertical direction with respect to the detected central axis is specified as the reduction region.

By this configuration, the reduction region is specified based on the face region of the person included in the image and the region of the range including the face region that expands in the vertical direction with respect to the central axis of the face is specified as the reduction region, for example, even when the person is obliquely positioned with respect to the image, that is, regardless of the angle.

In the image processing device of the invention, if a plurality of persons is included in the image, the face region extracting unit may extract the face regions of each of the plurality of persons, and, if reduction regions corresponding to the plurality of face regions include regions that overlap, the correction region specifying unit may specify the plurality of reduction regions and the overlapped regions as the reduction region.

In an image processing device having this configuration, if a plurality of persons is included in the image, the face regions of each of the plurality of persons are extracted, and, if the reduction regions corresponding to the plurality of face regions include regions that overlap, the plurality of reduction regions and the overlapped regions are specified as the reduction region.

By this configuration, even when a plurality of persons are close to each other in an image, regions including all the persons can be specified as reduction regions.

The image processing device of the invention may further include a reduction ratio storing unit storing the reduction ratio of the image of the reduction region, and a correction ratio input unit receiving the input of the reduction ratio of the image of the reduction region and storing the input reduction ratio in the reduction ratio storing unit, and the correction execution unit may reduce the image of the reduction region based on the reduction ratio stored in the correction ratio storing unit.

In an image processing device having this configuration, the input of the reduction ratio of the image of the reduction region is received and the image of the reduction region is reduced based on the input reduction ratio.

By this configuration, the image is corrected based on the reduction ratio input from a user of the image processing device of the invention.

In the image processing device of the invention, the correction execution unit may generate the correction image according to an area ratio or a width ratio of the reduction region to the enlargement region.

In an image processing device having this configuration, the correction image is generated according to the area ratio or the width ratio of the reduction region to the enlargement region of the image to be corrected.

By this configuration, an optimal correction image is generated according to the area ratio or the width ratio of the reduction region to the enlargement region.

An image processing method of an image processing device of the invention includes extracting a face region of a person included in an image to be corrected by a face region extracting unit; specifying a region including the extracted face region as a reduction region and specifying a region excluding the reduction region as an enlargement region, by a correction region specifying unit; and generating a correction image in which an image in the reduction region is reduced based on a predetermined reduction ratio and an image in the enlargement region is enlarged according to a ratio of the reduction region to the enlargement region, by a correction execution unit.

In an image processing method having this configuration, a face region of a person is extracted from the image, a region including the extracted face region is specified as a reduction region that is subjected to reduction correction, an enlargement region that is subjected to enlargement correction is specified, and a correction image in which an image in the reduction region is reduced based on a predetermined reduction ratio and an image in the enlargement region is enlarged according to a ratio of the reduction region to the enlargement region is generated.

By this configuration, the reduction and enlargement regions are specified based on the position of the face of the person included in the image to be corrected and the image is corrected according to the position of the person, regardless of the position at which the face of the person is present, for example, even when the person is at a position away from the center.

An image processing program embodied in a computer-readable medium of the invention executes, on a computer of an image processing device, a method including: extracting a face region of a person included in an image to be corrected; specifying a region including the extracted face region as a reduction region and specifying a region excluding the reduction region as an enlargement region; and generating a correction image in which an image in the reduction region is reduced based on a predetermined reduction ratio and an image in the enlargement region is enlarged according to a ratio of the reduction region to the enlargement region.

In an image processing program having this configuration, a face region of a person is extracted from the image, a region including the extracted face region is specified as a reduction region that is subjected to reduction correction, an enlargement region that is subjected to enlargement correction is specified, and a correction image in which an image in the reduction region is reduced based on a predetermined reduction ratio and an image in the enlargement region is enlarged according to a ratio of the reduction region to the enlargement region is generated.

By this configuration, the reduction and enlargement regions are specified based on the position of the face of the person included in the image and the image is corrected according to the position of the person, regardless of the position at which the face of the person is present, for example, even when the person is at a position away from the center.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are now described with reference to the accompanying drawings.

Figure 1:
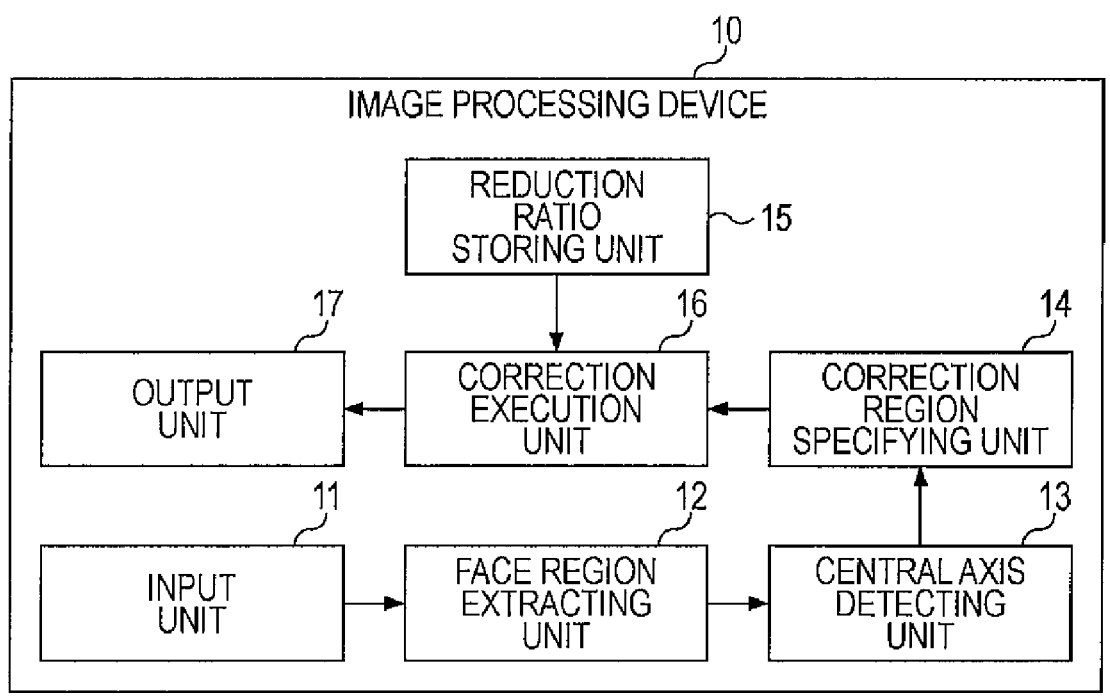
FIG. 1 is a block diagram of an image processing device according to an embodiment of the invention.

FIG. 1 is a block diagram of an image processing device 10 according to an embodiment of the invention. Although the image processing device 10 is described as an MFP (multi-function peripheral) printer, the invention is applicable to other devices for printing, editing and displaying an image including a person such as, for example, a home printer, a personal computer (PC), a personal digital assistant (PDA), a mobile telephone, a camera, a photographing device provided in a station, department store or the like, a mini-laboratory of a photo studio, and so on.

The image processing device 10 includes an input unit 11, a face region extracting unit 12, a central axis detecting unit 13, a correction region specifying unit 14, a reduction ratio storing unit 15, a correction execution unit 16 and an output unit 17.

Figure 2A:
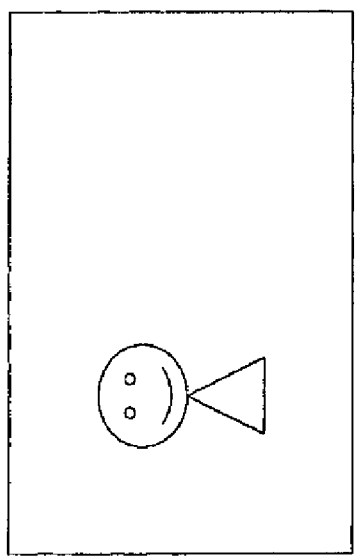
FIGS. 2A-2E show an example of an image to be corrected according to an embodiment of the invention.

The input unit 11 receives an input of information such as an image to be corrected, such as a photo including a person, or a reduction ratio of image correction. The input unit 11 has, for example, a scanner for scanning a printed image, reading information in bit units and receiving an input of image information, and receives an input of a photo image to be corrected in which a person is drawn at a position away from the center of a screen as shown in FIG. 2A. The input photo image is also called a color image. In addition, the input unit 11 receives the input of the image information and is, for example, a camera which has an image pickup device such as a charge coupled device (CCD) r a complementary metal oxide semiconductor (CMOS) or the like. The input unit 11 may also receive the input of the image information from an external storage device through a connector such as a universal serial bus (USB) or the like or receive the input of the image information over a network such as the Internet or the like. In addition, the input unit 11 includes an input device such as a keyboard, a button or the like and receives the input of a value such as a reduction ratio of an image upon correction of the image or the like.

The face region extracting unit 12 extracts a face region of the person from the image to be corrected. For example, the face region extracting unit 12 acquires color information of each pixel of the input image and extracts a skin color region from the image. The face region extracting unit 12 compares the arrangement of holes, recesses or the like in the extracted skin color region with template information of a face including positions of eyes, a nose or a mouth, which are previously stored in its storage region, and determines that the skin color region is the face region if both sides are matched while exceeding a predetermined threshold value. By this operation, for example, the face region extracting unit 12 calculates the direction, the size and the coordinate position of the face region from the image shown in FIG. 2A and extracts the face region enclosed within dashed line (b-1) of FIG. 2B.

The central axis detecting unit 13 detects the central axis of the face according to the direction of the extracted face region. The central axis detecting unit 13 detects the central axis passing through the center of the face from the arrangement of the eyes, the nose, the mouth and so on in the extracted face region. By this operation, the central axis detecting unit 13 detects the central axis of the face as shown by dashed line (c-1) of FIG. 2C.

Figure 2B:
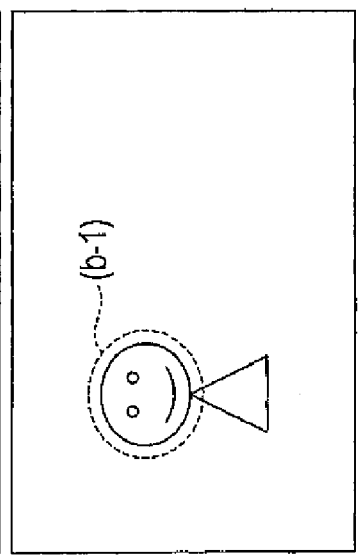
Figure 2C:
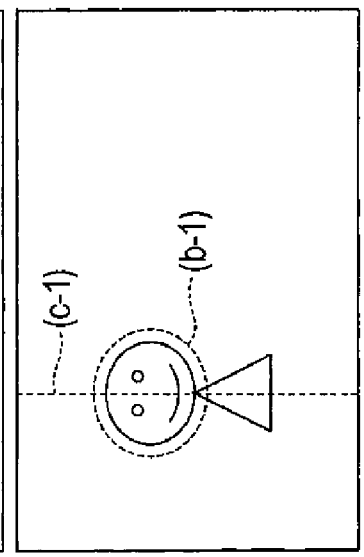
Figure 2D:
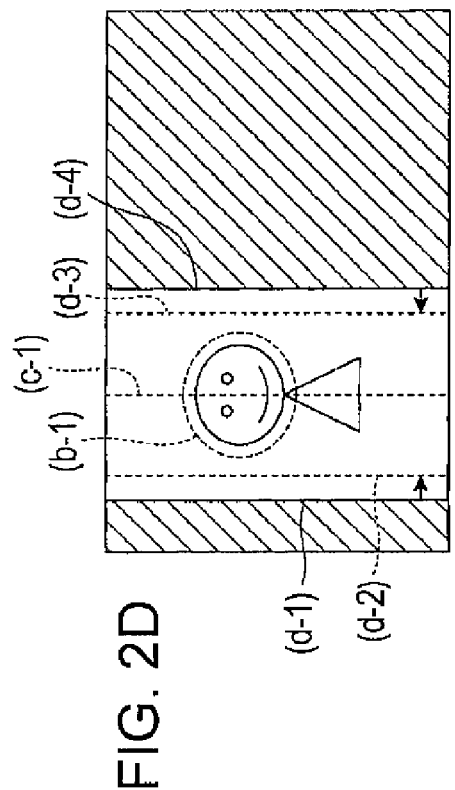

The correction region specifying unit 14 specifies a reduction region for performing reduction correction of the image and an enlargement region for performing enlargement correction based on the extracted face region. At this time, as shown in FIG. 2D, the correction region specifying unit 14 sets a region inside of lines (d-1) and (d-4) including the face region which expands in a vertical direction with respect to the central axis (c-1) as a reduction region, and sets the shaded region outside of lines (d-1) and (d-4) as an enlargement region.

The reduction ratio storing unit 15 stores the reduction ratio of the image of the reduction region. The reduction ratio may be stored before shipment or the value input from the input unit 11 may be stored. The reduction ratio may be, for example, a numerical value up to the second decimal place, such as "0.90".

The correction execution unit 16 reads the reduction ratio stored in the reduction ratio storing unit 15, reduces the image in the reduction region based on the read reduction ratio in the vertical direction with respect to the central axis of the face region, calculates an enlargement ratio of the enlargement region according to a ratio of the reduction region to the enlargement region, and generates a correction image that is enlarged according to the calculated enlargement ratio. For example, the region inside of lines (d-1) and (d-4) of FIG. 2D is the reduction region, and a ratio of the enlargement region from the left end of the image to line (d-1): the reduction region inside of line (d-1) and (d-4): the enlargement region from line (d-4) to the right end of the image is 1:4:5. At this time, if the reduction ratio of the reduction region is 0.90, the reduction region inside of lines (d-1) and (d-4) is reduced to fit to the region inside of lines (d-2) and (d-3) according to the reduction ratio of 0.90.

The correction execution unit 16 calculates the enlargement ratio of the enlargement region according to the ratio of the reduction region to the enlargement region such that the aspect ratio of the image is constantly maintained before and after the correction. For example, the ratio of the region inside of lines (d-2) and (d-3), which is the reduction region after reduction correction, to the whole image to be corrected (10) is 4×0.90=3.6. In order to make the aspect ratio of the image equal to that of the image before the correction, a value obtained by dividing a difference (6.4) between the whole image (10) and the ratio of the reduction region after reduction correction to the whole image (3.6) by the ratio of the enlargement region to the whole image (6) becomes the enlargement ratio of the enlargement region. At this time, the enlargement ratio becomes (10 (whole image)−3.6 (ratio of the reduction region after the reduction correction to the whole image))÷6≅1.06. The correction execution unit 16 enlarges the image of the enlargement region by the calculated enlargement ratio.

The output unit 17 outputs the corrected image. For example, the output unit 17 may display the corrected image on a display unit or the like, may print and output the corrected image on a paper medium, may output corrected image information to a connected storage medium, or may output the image information over a network.

Figure 3:
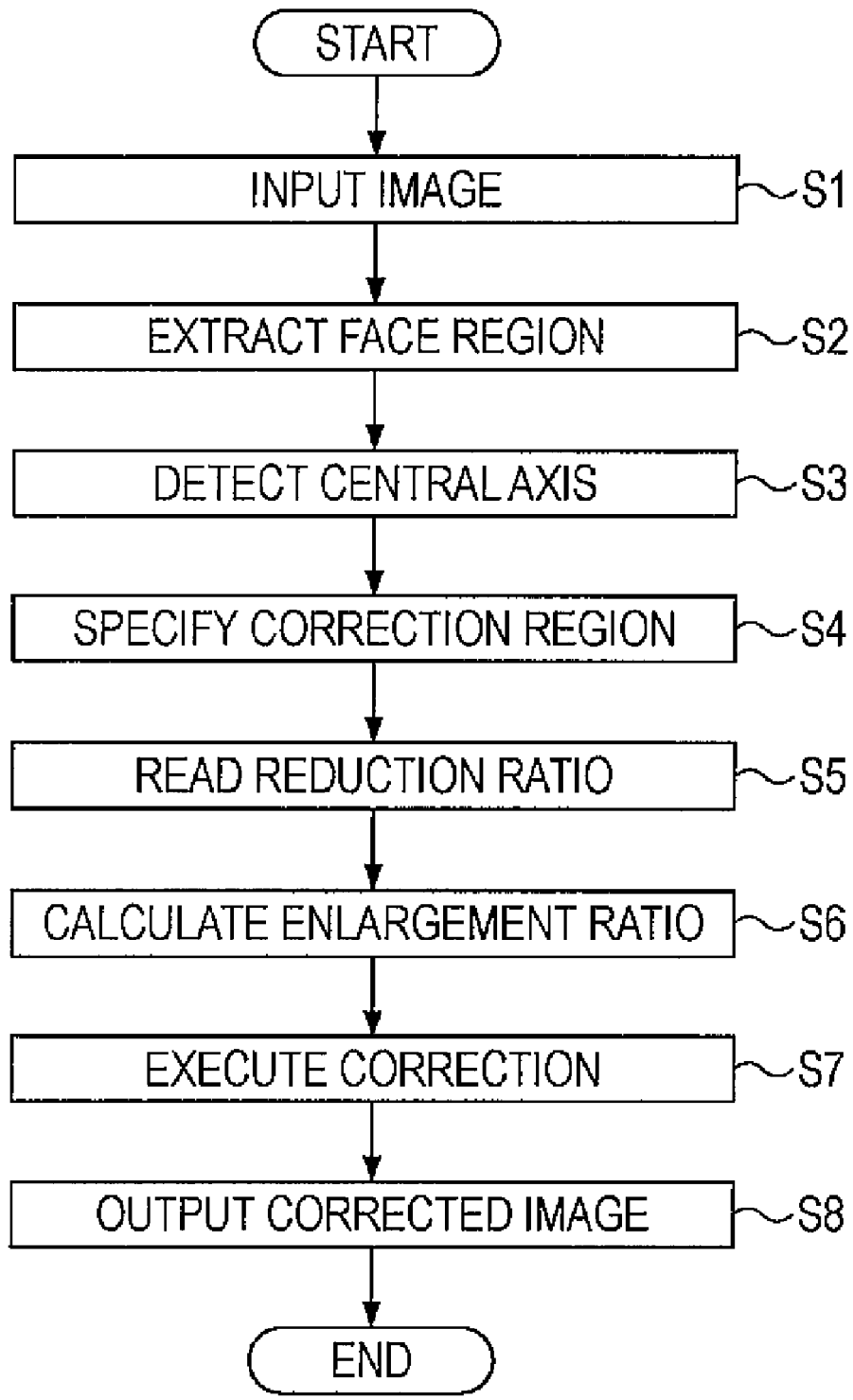
FIG. 3 is a flowchart showing operation of an image processing device according to an embodiment of the invention.

An operation example in which the image processing device 10 according to the present embodiment performs image correction is now described. FIG. 3 is a flowchart showing operation of the image processing device 10. In this example, the reduction ratio storing unit 15 stores a reduction ratio of 0.90 that is previously input by a user through the input unit 11.

First, the input unit 11 receives the input of the image to be corrected (step S1). In the example of FIG. 2A, the photo image to be corrected includes a person at a position away from the center of the image.

In step S2, the face region extracting unit 12 extracts the face region from the image input in step S1. As shown in FIG. 2B, the face region within dashed line (b-1) is extracted from the image.

In step S3, the central axis detecting unit 13 detects the central axis (c-1) of the face region extracted in step S2.

In step S4, the correction region specifying unit 14 specifies the correction region of the image based on the central axis detected in step S3. As shown in FIG. 2D, lines (d-1) and (d-4) are specified as the boundaries of the correction region, such that the inside of lines (d-1) and (d-4) is the reduction region and the outside of lines (d-1) and (d-4) is the enlargement region.

Figure 2E:
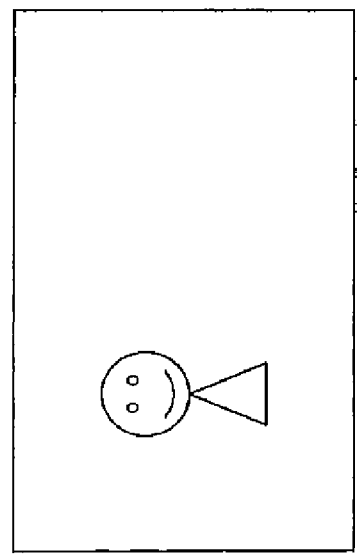

In step S5, the correction execution unit 16 reads the reduction ratio stored in the reduction ratio storing unit 15. In step S6, the correction execution unit 16 calculates the enlargement ratio of the enlargement region according to the reduction ratio of the reduction region. In step S7, the correction execution unit 16 reduces the reduction region of the correction region specified in step S4 based on the reduction ratio read from the reduction ratio storing unit 15, and executes a correction process of enlarging the image of the enlargement region specified in step S4 based on the calculated enlargement ratio. Here, the image of the reduction region inside of lines (d-1) and (d-4) is reduced to fit inside of lines (d-2) and (d-3). At the same time, the image of the enlargement region outside of lines (d-1) and (d-4) is enlarged to the region outside of lines (d-2) and (d-3). By this operation, as shown in FIG. 2E, even when a person away from the center of the image is present, the reduction and enlargement corrections of the image are performed based on the person, and the image is corrected such that the person slims. The output unit 17 outputs the corrected image in step S8.

Figure 4A:
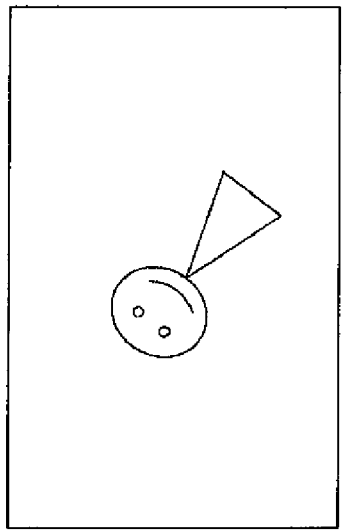
FIGS. 4A-4D show an example of an image to be corrected according to an embodiment of the invention.
Figure 4B:
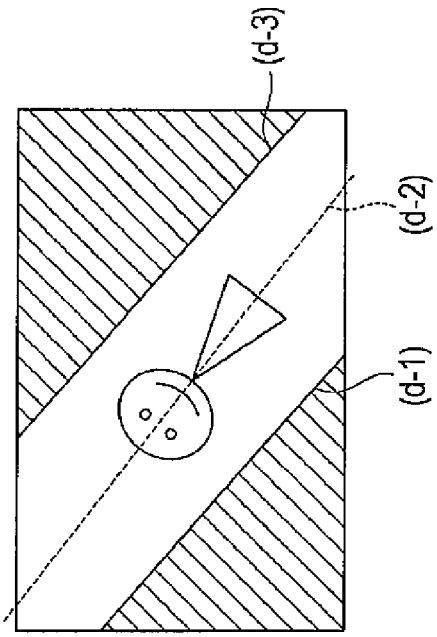

If a plurality of persons is included in an image to be corrected, the image processing device 10 may specify reduction and enlargement regions based on each of persons. For example, as shown in FIGS. 4A and 4B, if an image including three persons is corrected, reduction and enlargement regions are specified based on the central axes detected from the persons. In FIG. 4B, (b-1), (b-2), (b-3) and (b-4) are specified as the boundaries between the reduction and enlargement regions. The spaces between (b-1) and (b-2) and between (b-3) and (b-4) are specified as reduction regions, and the other shaded portions are specified as enlargement regions, and the image correction process is performed. The face region extracting unit 12 extracts the face regions of each of the plurality of persons, and, if the reduction regions corresponding to the plurality of face regions include regions that overlap, the correction region specifying unit 14 specifies the region (e.g., the space between (b-3) and (b-4)) including the overlapped regions and the plurality of reduction regions as the reduction region.

Figure 4C:
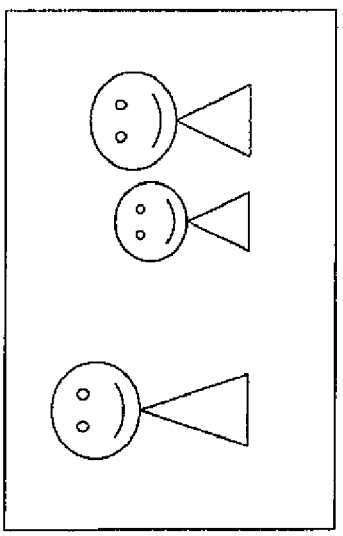
Figure 4D:
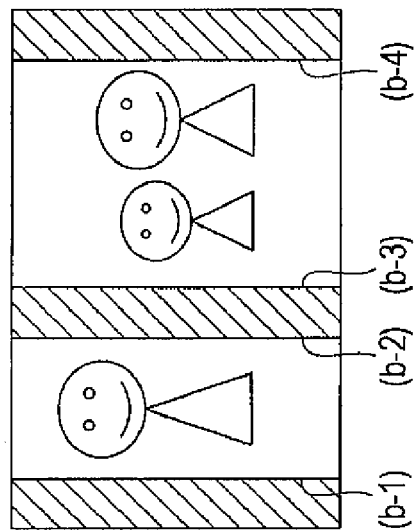
Figure 5A:
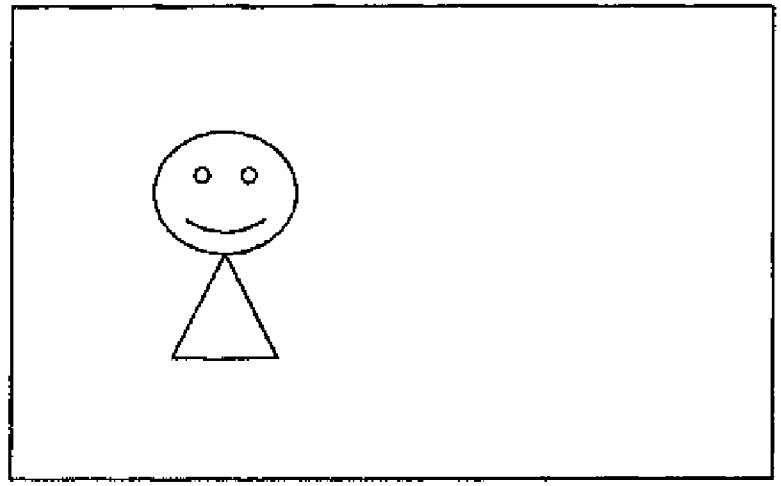
FIGS. 5A and 5B show an example of an image to be corrected in the related art.
Figure 5B:
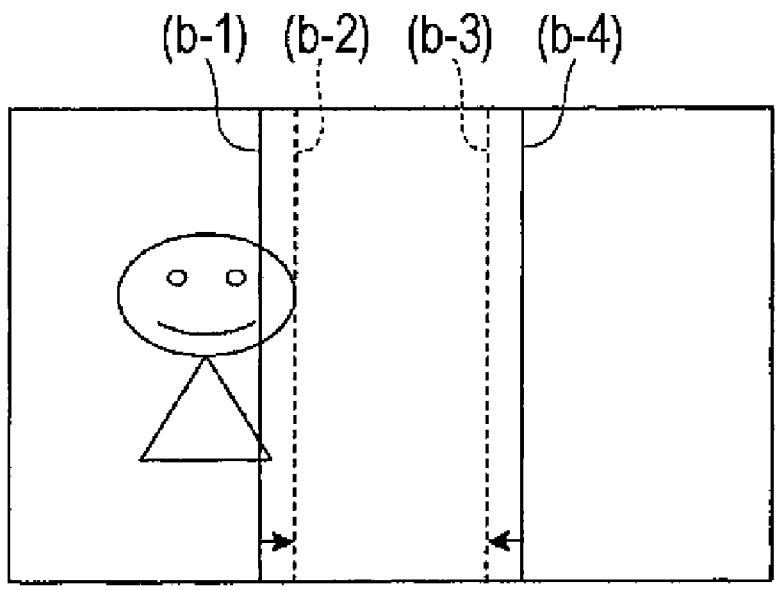

In addition, even when a person is not displayed in the vertical direction of the image but is obliquely displayed, the image processing device 10 may specify the face region of the person in the oblique state and detect the central axis of the face region based on the arrangement of eyes, a nose, a mouth and so on, thereby specifying the reduction and enlargement regions. For example, as shown in FIG. 4C, if the person is obliquely displayed, the central axis of the person is detected as (d-2) and boundaries (d-1) and (d-3) of the reduction and enlargement regions are specified based on the central axis (d-2). In addition, if a plurality of persons is included in the image with different tilts, the average value of the tilts may be calculated and the reduction region may be specified based on the calculated average value of the tilts or based on a tilt having many close angles of the plurality of different angles.

A program that realizes the functions of the processing unit of the invention may be recorded on a computer-readable recording medium, and read to a computer system and executed, thereby performing image correction of. A "computer system" as described herein includes hardware such as an operating system (OS), a peripheral device, or the like, as well as a WWW system including a homepage provision environment (or a display environment). A "computer-readable recording medium," indicates a portable medium such as a flexible disc, a magnetooptical disc, a ROM, a CD-ROM or the like or a storage device such as a hard disc built in the computer system or the like. In addition, the "computer-readable recording medium" includes a medium which holds a program during a predetermined time, such as a volatile memory (RAM) in the computer system which is a server or a client when the program is transmitted through a communication link such as a telephone line or the like or a network such as the Internet or the like.

The program may be transmitted from the computer system, in which this program is stored in the storage device, to another computer system via a transport medium or a transmission wave of the transport medium. A "transport medium" for transmitting the program indicates a medium having a function for transmitting information, including a communication network such as the Internet or the like or a communication link (line) such as a telephone line or the like. The program may realize a portion of the above-described functions. In addition, a program for realizing the above-described functions by a combination with a program that is previously recorded on the computer system, that is, a so-called differential file or program, may be used.

What is claimed is:

1. An image processing device comprising:
    a face region extracting unit extracting a face region of a person included in an image to be corrected;
    a correction region specifying unit specifying a region including the extracted face region as a reduction region and a region excluding the reduction region as an enlargement region; and
    a correction execution unit generating a correction image in which an image in the reduction region is reduced based on a predetermined reduction ratio and an image in the enlargement region is enlarged according to a ratio of the reduction region to the enlargement region.

2. The image processing device according to claim 1, further comprising a central axis detecting unit detecting a central axis passing through the center of a face of the extracted face region,
    wherein the correction region specifying unit specifies a region of a range of a vertical direction with respect to the detected central axis as the reduction region.

3. The image processing device according to claim 1, wherein:
    if a plurality of persons is included in the image, the face region extracting unit extracts the face regions of each of the plurality of persons, and
    if reduction regions corresponding to the plurality of face regions include regions that overlap, the correction region specifying unit specifies the plurality of reduction regions and the overlapped regions as the reduction region.

4. The image processing device according to claim 1, further comprising:
    a reduction ratio storing unit storing the reduction ratio of the image of the reduction region; and
    a correction ratio input unit receiving the input of the reduction ratio of the image of the reduction region and storing the input reduction ratio in the reduction ratio storing unit,
    wherein the correction execution unit reduces the image of the reduction region based on the reduction ratio stored in the correction ratio storing unit.

5. The image processing device according to claim 1, wherein the correction execution unit generates the correction image according to an area ratio or a width ratio of the reduction region to the enlargement region.

6. An image processing method of an image processing device for correcting an image including a person, the method comprising:
    extracting a face region of a person included in an image to be corrected by a face region extracting unit;
    specifying a region including the extracted face region as a reduction region and specifying a region excluding the reduction region as an enlargement region, by a correction region specifying unit; and
    generating a correction image in which an image in the reduction region is reduced based on a predetermined reduction ratio and an image in the enlargement region is enlarged according to a ratio of the reduction region to the enlargement region, by a correction execution unit.

7. An image processing program embodied in a non-transitory computer-readable medium and executing, on a computer of an image processing device, a method comprising:
    extracting a face region of a person included in an image to be corrected;
    specifying a region including the extracted face region as a reduction region and specifying a region excluding the reduction region as an enlargement region; and
    generating a correction image in which an image in the reduction region is reduced based on a predetermined reduction ratio and an image in enlargement region is enlarged according to a ratio of the reduction region to the enlargement region.

* * * * *